United States Patent [19]
Boaz et al.

[11] Patent Number: 5,535,349
[45] Date of Patent: Jul. 9, 1996

[54] DATA PROCESSING SYSTEM AND METHOD FOR PROVIDING CHIP SELECTS TO PERIPHERAL DEVICES

[75] Inventors: Shachar Boaz, Givataim; Yeivin Yoram, Petch-Tikva; Rudin Yehuda, Netanya, all of Israel

[73] Assignee: Motorola, Inc., Schaumburg, Ill.

[21] Appl. No.: 257,493

[22] Filed: Jun. 9, 1994

[51] Int. Cl.$^6$ .................................................... G06F 12/02
[52] U.S. Cl. ............................................ 395/401; 395/166
[58] Field of Search .......................... 395/114, 162–166, 395/425, 200, 401, 428; 364/229.2, 230.4, 230.6, 31.44, 42.4; 345/27.28, 200

[56] References Cited

U.S. PATENT DOCUMENTS 4,628,467 12/1986 Nishi et al. .............................. 364/900
4,888,709 12/1989 Revesz et al. ........................... 395/114

Primary Examiner—Mark R. Powell
Assistant Examiner—Kee M. Tung
Attorney, Agent, or Firm—Keith E. Witek

[57] ABSTRACT

A processor (50) is coupled to a plurality of peripherals (56 and 58) via an address bus (54) and a data bus (52). The peripherals (56 and 58) contain base address registers (BARs) (68 and 70). The peripherals (56 and 58) are either identical peripherals or similar peripherals wherein the BARs (68 and 70) are addressed via the same address within the system. In order to allow for each peripheral (56 and 58) to be written with a unique BAR value (in order to allow each peripheral to have a separate and distinct address space), the storage devices (64 and 66) are provided. When a data value is sent on the data bus (52) which has a set D0 bit and a cleared D1 bit, the device (64) is set to an asserted state and the device (66) is set to a deasserted state. This asserted state on device (64) allows the BAR (68) to be written on the next write operation if the address provided via address bus (54) corresponds to the BARs (68 and 70) while device (66) preempts BAR (70) from being written due to it's deasserted state. This method can be used for systems with no BARs and for N peripherals wherein N is a finite integer greater than zero.

29 Claims, 2 Drawing Sheets

DATA PROCESSING SYSTEM AND METHOD FOR PROVIDING CHIP SELECTS TO PERIPHERAL DEVICES

FIELD OF THE INVENTION

The present invention relates generally to data processing systems, and more particularly, to providing chip selects from a processor to one or more peripherals.

BACKGROUND OF THE INVENTION

Typically, processor systems are and board level designs are composed of one or more processors coupled to one or more of memory devices, glue logic, control logic, PALs, PLAs, programmable peripherals, UARTs, direct memory access controllers, memory management units, programmable A/D and D/A converters, timers, and other known peripheral devices. Most of these peripherals are coupled to a subset of the address bus, enabling processor accessibility to the peripheral's internal registers. In addition, each peripheral has a pin/terminal which is used as a chip select. The chip selects (CS) are usually one-hot and are used to select one peripheral chip out of a plurality of peripheral chips. Using the CS pins, a system designer has to map each of the peripherals to a specific address space within the global address space (either virtual or physical) addressable by the processor. The specific address spaces for peripherals are chosen so that there is no overlap between any two address spaces for the peripherals. This mapping process is done during the board level design and is implemented in hardware using either PALs, programmable control, or discrete logic.

The use of these PALs, programmable control, or discrete logic to set up an address space for peripherals has various disadvantages. An external decoder, implemented via PALs for example, is required when using this method (see prior art FIG. 1 herein). In FIG. 1, a master device 10 having an optional base address register (BAR) 12 controls the address lines on the illustrated address and data bus. The master device 10 outputs an address. The decoders 18, 24, and 30 of FIG. 1 decode the address and enable, via a chip select signal, one of the devices 14, 20, and 26. When the address is decoded by the decoder, the slave devices perform another redundant decoding due to internal decoding circuitry. One of the BARs 16, 22, or 28 is selectively written if the corresponding decoder 18, 24, or 30, respectively, determines that the address provided to the address bus was for writing a BAR. In other write cases, a register within one of either slave device 14, 20, or 26 may be written or none of the devices 14, 20, and 26 may be written, depending upon the address value.

The external decoders in FIG. 1 are used to generate the CS signals for each of the peripherals coupled to the processor. The address of each peripheral is usually determined during the design of the board and is not easy to change during software development, which is usually the next stage of final production evaluation. The external decoder increases board design size and is also an added time delay for electrical signals and peripheral use.

Furthermore, some peripherals include base address registers (BARs), each of which is used to define a particular address space for its corresponding peripheral. For example, assume that a peripheral A has six locations which are byte wide and need to be set into a memory address space. A BAR, which is written with the value of 0122H (0122 hexadecimal) allows the six registers to be accessed via the addresses 0122, 0123, 0124, 0125, 0126, and 0127, respectively. A peripheral having a BAR is usually coupled to all address lines from the processor, and implements an internal full address space decoder. The addition of an external decoder in order to distinguish between various BAR peripherals is especially inefficient, since an internal decoding is performed anyway. Furthermore, many peripherals have BARs which are located at the same address. For example, if four identical peripherals A, each having a BAR, are coupled to the processor, then when the processor writes the BAR for one peripheral A, all peripherals A are set to that BAR address and all peripherals A have the same overlapping and inoperative address space. A method to set identical peripherals or peripherals with the same BAR address to different address spaces without wasteful decoders is required.

SUMMARY OF THE INVENTION

The previously mentioned disadvantages are overcome and other advantages achieved with the present invention. In one form, the present invention comprises a method for providing a chip select from a data processor to a selected peripheral. The method begins by sending a data value from the data processor to the selected peripheral via a data bus wherein the data bus is coupled between the data processor and the selected peripheral. The data value having at least one asserted bit and at least one unasserted bit. The selected peripheral receives the at least one asserted bit communicated via the data bus. The at least one asserted bit enables a control line within the selected peripheral. Both an address and a register data value are respectively provided to the selected peripheral via (1) an address bus coupled between the data processor and the selected peripheral and (2) the data bus coupled between the data processor and the second peripheral. The address corresponds to a register within the selected peripheral, and the register data value is stored into the register in response to the asserted control line.

Other methods are discussed herein.

In another form, the invention comprises a data processing system having a processor. The processor has both a first plurality of terminals for providing data via a data bus having a plurality of conductors and a second plurality of terminals for providing addresses via an address bus having a plurality of conductors. The data processing system also has a first peripheral having a first plurality of input terminals for receiving data via the data bus, a second plurality of terminals for receiving addresses via the address bus, a control input for receiving a first unique conductor of the data bus, and a base address register (BAR) internal to the first peripheral which is used to determine an address space of the first peripheral. The data processing system also has a second peripheral having a first plurality of input terminals for receiving data via the data bus, a second plurality of terminals for receiving addresses via the address bus, a control input for receiving a second unique conductor of the data bus wherein the first and second unique conductors of the data bus are different conductors, and a base address register internal to the second peripheral which is used to determine an address space of the second peripheral. A control signal is sent to the first and second peripherals via the data bus wherein only one of the first or second unique conductors provides an asserted signal. The asserted signal selects one of the first or second peripherals as a selected peripheral. The selected peripheral receives a subsequent write operation wherein the subsequent write operation is used to write a base address value to the base address register of the selected peripheral.

The present invention will be more clearly understood from the detailed description below in conjunction with the accompanying drawings.

Figure 1:
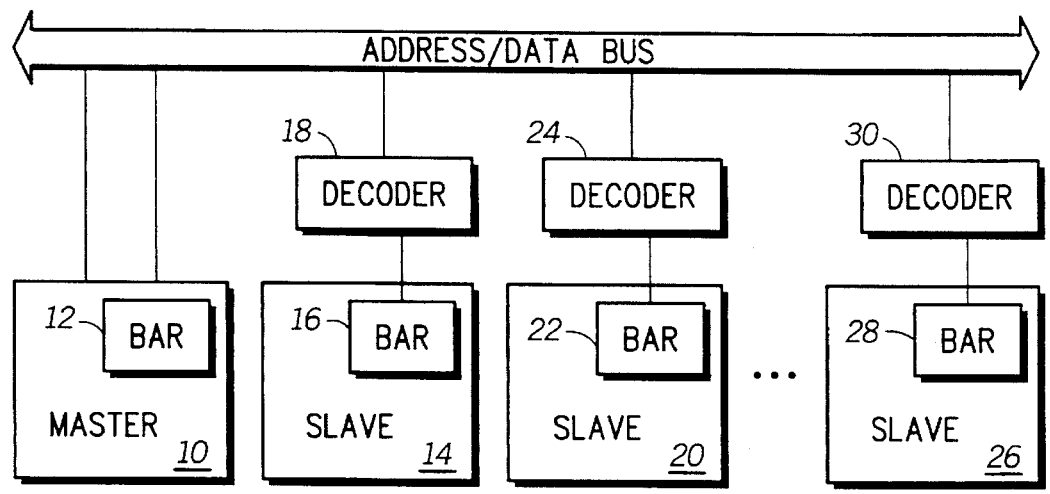
FIG. 1 illustrates, in a block diagram, a conventional data processing system using unwanted external decoders.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Figure 2:
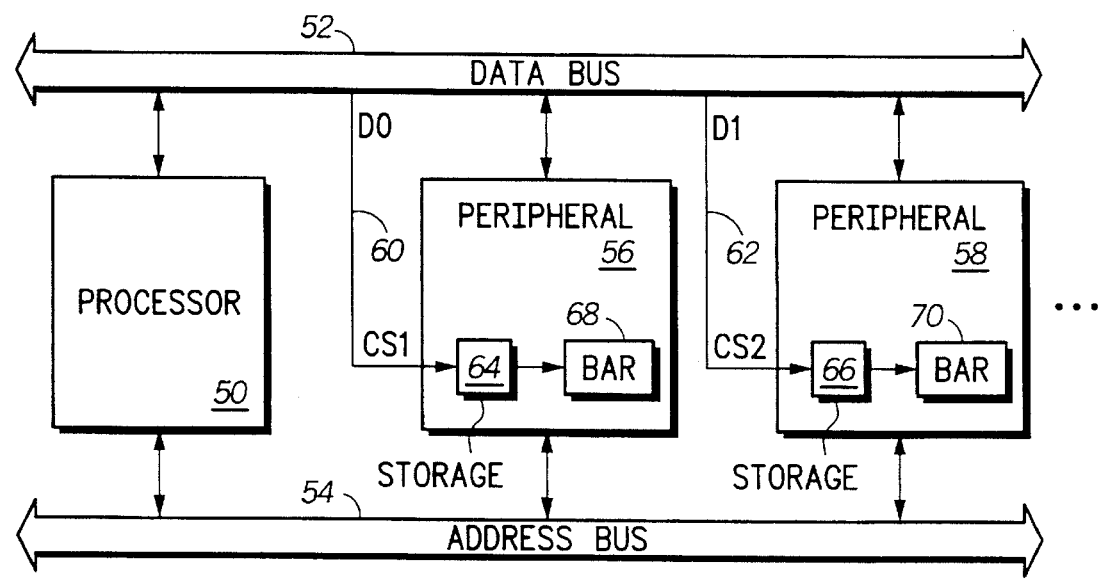
FIG. 2 illustrates, in a block diagram, a data processing system in accordance with the present invention.
Figure 3:
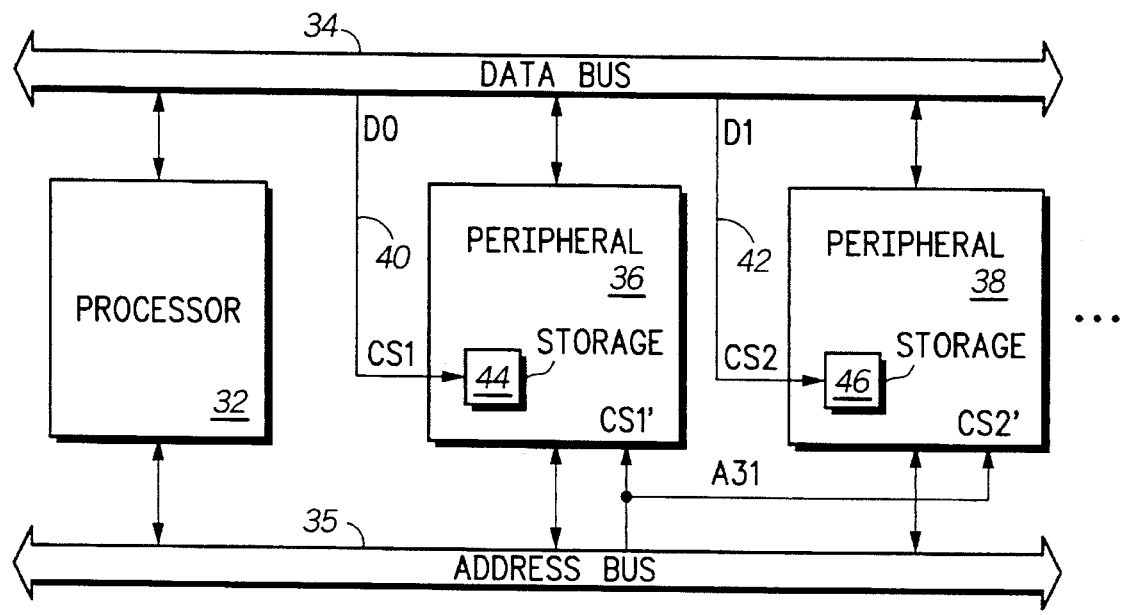
FIG. 3 illustrates, in a block diagram, another data processing system in accordance with the present invention.
Figure 4:
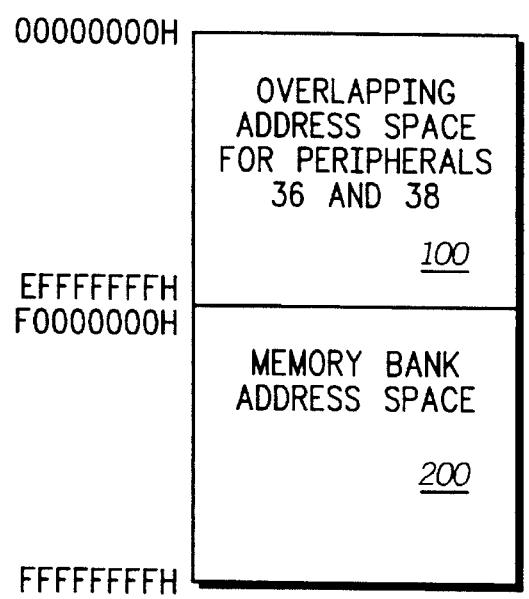
FIG. 4 illustrates, in a block diagram, a memory map of one particular configuration of FIG. 3 in accordance with the present invention.

Illustrated in FIG. 1 is prior art diagram which is discussed in detail in the Background above. In general, the prior art FIG. 1 illustrates decoders 18, 24, and 30 which are disadvantageous due to space constraints and time delays. The decoders 18, 24, and 30, were used to solve a problem of correctly writing, in an independent manner, a base address register (BAR) value of several peripherals wherein each peripheral has a base address register (BAR 16, 22, and 28 in FIG. 1) which are addressed via the same binary address. Unfortunately, the decoders 18, 24, and 30 perform decode operations which are redundant to decode operations which will subsequently be re-performed in the peripherals, thereby wasting more time, etc. FIGS. 2–4 illustrate a data processing system and a method for performing the same function in a more efficient manner without added time delay paths, added circuit area, and added redundant decoding.

FIG. 2 illustrates a data processing system having a processor 50. Processor 50 can be any processor such as a microprocessor, hard-wired logic, a bus master device, a digital signal processor (DSP), a microcontroller unit (MCU), a microcoded machine, a CISC machine, a RISC machine, a computer, a central processing unit (CPU), a programmable logic device, or any like processing device. The processor 50 is capable of driving and/or receiving information via a data bus 52. Data buses are a group of one or more conductive lines which are used to transmit data to and from the processor 50. Typical data bus sizes in the industry are 1-bit buses, 4-bit buses, 8-bit buses, 16-bit buses, 24-bit buses, 32-bit buses, 64-bit buses, although any number of bit-lines or conductive lines can comprises a bus. Data bus bits are numbered from least significant to most significant via the notation D0–D31 (for a 32-bit bus example).

Coupled to the processor is an address bus 54. Address bus 54 contains one or more conductive lines as w is the case for the data bus. The data bus 52 and address bus 54 are typically the same size although this is not required. Address bits are denoted from least significant to most significant via the notation A0–A31 (for a 32-bit address bus). Address buses are used to send bits through the data processing system wherein these bits are used to decide which peripheral or memory device is being accessed by the processor 50 or bus master.

FIG. 2 illustrates a peripheral device 56 which is coupled to the address bus 54 via a first plurality of terminals/pins and coupled to the data bus 52 via a second plurality of terminals/pins. In general, a peripheral device can be any device such as one or more memory devices, glue logic, control logic, PALs, PLAs, ASICs, programmable peripherals, UARTs, direct memory access (DMA) controllers, memory management units (MMUs), programmable A/D and D/A converters, timers, programmable counters, another CPU or processor, video devices/chips, and other known peripheral devices. Peripheral 56 has a control input, also referred to as a chip select (CS1), which is coupled to any data bit from the data bus. In FIG. 2, the peripheral device 56 is coupled to D0, which is the least significant bit of the data bus 52. The address bus 54 is used by the processor 50 to communicate to the peripheral 56 an address of a register or location within the peripheral 56.

This register or location includes a base address register (BAR) 68 which is set to a value via a write operation from the processor 50. If peripheral 56 were the only peripheral in the system, then when the address bus is set to the address of the BAR 68 and the data bus contains 02A0H (02A0 in hexadecimal, for example), then the BAR 68 is written to the value 02A0H. This write defines the address space of the peripheral 56 wherein any address in this address space will access a portion of the peripheral 56. For example, if the BAR 56 were set to a value of 02A0H and the peripheral 56 included 32 byte-addressable locations which must be addressed, then the BAR 56 functions as a pointer to the first address of these 32 byte-addressable locations. Therefore the 32 byte locations in the peripheral 56 are addressed via address values from 02A0H to 02C0H. The address space is therefore set for a peripheral by the "pointer" BAR 68.

It is important to note that the addressable contents of the peripheral may be byte-addressable, word-addressable, bit-addressable, longword-addressable, nibble-addressable, and/or the like. Furthermore, the BAR 68 may be of any bit size (i.e. any number of bits in length). In some cases, the BAR 68 may store only a portion of the bits from the address bus and therefore the BAR 68 functions as a base address pointer while other address bits function as least significant address bits for peripheral accesses.

In many designs, two peripherals which are similar or identical must be used in the system. For example, in FIG. 2 a peripheral 58, which is similar or identical to peripheral 56 is added to the address and data buses. In this case, both BAR 68 and BAR 70 will be addressed via the same address value on the address bus. Therefore, one cannot write BAR 70 without writing BAR 68. This dual write is disadvantageous since both peripherals 56 and 58 would reside in the same address space and distinguishing between peripherals 56 and 58 would be impossible. The prior art overcomes this problem by adding external decoders which is not necessary once the methods/structures described herein are implemented.

In order to allow both BARs 68 and 70 to be written independently, peripheral 56 has a CS1 chip select which is coupled to D0 while peripheral 58 has a chip select (CS2) which is coupled to D1. It should be noted that other data bits may be coupled to peripherals 56 and 58 besides D0 and D1. For example CS1 could be coupled to D14 and CS2 could be coupled to D25. In general, CS1 and CS2 cannot be coupled to the same data bit (for example, D0 could not be coupled to both CS1 and CS2). D0 and D1 are illustrated herein due to the fact that they are a preferred choice for simplicity of illustration. Other data bits may be used besides D0 and D1. Other peripherals having a BAR accessed at the same address may be added to FIG. 2 as long as another unique data bit besides D0 and D1 (i.e., D2 through D31) is connected to each of the peripherals added. For a thirty-two bit data bus, this means that 32 peripherals having the same BAR address can be added to a system without causing problems as indicated above or without requiring external decoders.

The CS1 and CS2 receive respectively the data bits D0 and D1. These CS1 and CS2 values are respectively latched/stored in the peripherals 56 and 58 via storage devices 64 and 66. Storage devices 64 and 66 may each be a transparent latch, a D flip-flop, another type of flip-flop, a register bit, or a like storage element.

The operation of the structure of FIG. 2 is describe below. If the process wants to write to BAR 68 to set up peripheral 56 but not write to BAR 70 (which resides at the same address as BAR 56), the following is performed:

(1) The processor 50 writes a data value onto the bus wherein D0 is a one and D1 is a zero. All other data bits coupled to a peripheral having a BAR with the same address as BAR 68 will also be zero. All other data bits are don't cares (i.e., can be either zeros or ones).

(2) The writing of the data value (wherein D0=1 and D1=0) onto the bus enables a control line from storage 64 to BAR 68 and disables a control line from storage 66 to BAR 70. The asserted control line in peripheral 56 between storage 64 and BAR 68 allows BAR 68 to be written in a next bus cycle, whereas the deasserted control line in peripheral 58 between storage 66 and BAR 70 does not allow BAR 70 to be written in a next bus cycle.

(3) The next bus cycle places the address of BARs 68 and 70 (the addresses are the same for both BARs) onto the address bus and places the base address register value to be stored into BAR 68 onto the data bus. Due to the asserted control signal and the presence of the address value for the BAR 68 on the address bus, the data bus values or a portion of the data bus values are written into BAR 68 and peripheral 56 now has a newly defined address space. This write operation also negates the storage 66 since an asserted storage 66 is no longer needed.

This operation of writing the BAR 68 without writing BAR 70 is illustrated below via the code example A (assume that BAR represents the decimal address of the BAR 68):

CODE EXAMPLE A:

| move.l | #01,storage64 | /* write a D0=1, D1–D31=0 to data bus at address of storage device 64. The data #01 will enable writing to BAR 68 and disable writing to BAR 70 as discussed above */ |
|---|---|---|
| move.l | #02A0H,BAR | /* write a 02A0 hexadecimal base address value to the BAR 68 wherein BAR is the address used for writing to BAR 68 and 70 */ |

In the above, code example, the BAR 68 of peripheral 56 is written to the value 02A0H while the D1=0 value written above prevents the BAR 70 from being written via the control signal from storage 66 to BAR 70 in peripheral 58.

In a like manner, if a data value of D0=0 and D1=1 were output on the data bus by writing to address "storage66" in FIG. 2, BAR 70 could be written while BAR 68 prevented from being written even though both BAR 68 and 70 are addressed by the same address. In general, "storage64" and "storage 66" are the same address values. The following code example B shows how to write BAR 70 while not affecting BAR 68:

CODE EXAMPLE A:

| move.l | #02,storage66 | /* write a D1=1, D0=0, D2–D31=0 to storage66. The data #02 will enable writing to BAR 70 and disable writing to BAR 68 as discussed above */ |
|---|---|---|
| move.l | #EA06H,BAR | /* write a EA06 hexadecimal base address value to the BAR 70 wherein BAR is the address used for writing to BAR 68 and 70 */ |

In the code example B above, the BAR 70 of peripheral 58 is set to EA06 hexadecimal and does not affect BAR 68. If code example A and code example B are combined, the code example C illustrates the resulting code:

CODE EXAMPLE C:

| move.l | #01,storage64 |
|---|---|
| move.l | #02A0H,BAR |
| move.l | #02,storage66 |
| move.l | #EA06H,BAR |

In Code Example C, the BAR 68 is set to 02A0 hexadecimal and BAR 70 is set to EA06 hexadecimal. Therefore, even though both BARs 68 and 70 are addressed via the same address, the BARs may be independently written to place the peripherals in independent address spaces which function properly. It is important to note that the actual write to the BAR results in the clearing of the storage that enables that write, although in another form, this clearing may not be automatic and performed manually via an addition write operation.

It should be noted that if the BAR 68 can be limited to values wherein D0=1 always and BAR 70 can be limited to values wherein D1=1 or if the BAR latches a portion of the data bus which does not include the data bits D0 or D1, then the BARs 68 and 70 can be written in one instruction rather than two. For example:

CODE EXAMPLE D:

| move.l | #E821,BAR | /* the data bit D0=1 and D1=0 therefore only BAR 68 is selected to be written and, in the same bus cycle, the BAR 68 latches the value E821 or a portion of E821 as a BAR value */ |
|---|---|---|
| move.l | #66A2,BAR | /* the data bit D0=0 and D1=1 therefore only BAR 70 is selected to be written and, in the same bus cycle, the BAR 70 latches the value 66A2 or a portion of 66A2 as a BAR value */ |

Although the method discussed in Code Example D requires less instructions it potentially limits the BAR values of BAR 68 to certain odd numbers and the BAR values of BAR 70 to certain even numbers unless D0 and D1 are not latched by the BARs.

FIG. 3 illustrates a data processing system wherein the peripherals 36 and 38, which are coupled to a processor 32, have no base address registers (BARs). If the peripherals 36 and 38 have no BARs but are addressed via a subset of the address bus and reside in the same address space, then the structure of FIG. 3 is used to avoid address space conflicts when writing and reading. It should be noted that the address and data buses in FIG. 3 are analogous to the address and data buses of FIG. 2. In FIG. 3, 32-bit address and 32-bit data buses are used although other sizes may be used.

In FIG. 3, CS1 and CS2 are coupled as illustrated in FIG. 2. It is important to note that other bits besides D0 and D1 may be coupled to CS1 and CS2 in FIG. 3 as discussed above. Since, the peripherals 36 and 38 of FIG. 32 have no BARs, one address bit (in this case the most significant address bit A31 is arbitrarily selected for illustration) is coupled to a second chip select CS1' and CS2' of each peripheral 36 and 38. The address and data buses are coupled from the processor 32 to the peripherals 36 and 38 as illustrated and discussed with respect to FIG. 2.

The structure of FIG. 3 operates as discussed below:

First, in order to enable one of the two peripherals 36 and 38 for a write or read operation (assume that the processor 32 needs to write to peripheral 38 for this example), the processor 32 provides a data value on the data bus which has D1=1 and D0=0. This data value could be, for example, one of either 0002H, 3B72H decimal or 24D6H decimal. In any case, if N peripherals are coupled to the processor 32 via the address and data bus, wherein the N peripherals' address spaces overlie one another, then only one CS bit (i.e. one data line used as a CS input) is usually set so that only one peripheral is selected among the N peripherals with the overlapping address space.

Along with the data value, the processor 32 provides an address value on the address bus wherein the A31 bit is set. The simultaneous set A31 bit and the set D1 bit on the data bus provide a two dimension decode scheme wherein one of the N peripherals (illustrated as two peripherals 36 and 38) are selected. The selected peripheral is the peripheral which receives an asserted CS=D0 via the data bus and an asserted A31 via the address bus. The selected peripheral in the above example is peripheral 38 since the D1 bit into CS2 is set, A31 is set, but D0 is cleared. The cleared D0 bit and the set A31 bit clears the storage element 44 in peripheral 36 indicating that during a next bus cycle, peripheral 36 is not selected. Storage element 46 in peripheral 38 is set due to the fact that CS2 (i.e., D1) and CS2' (i.e. A31) are both set. Storage elements 44 and 46 may be a latch, a D flip-flop, a T flip-flop, or a like storage element.

In a bus cycle following the bus cycle discussed above wherein a particular peripheral is selected (peripheral 38 is selected as indicated above for this example), an address is output by the processor 32 which corresponds to an address location in both peripheral 36 and peripheral 38. This address has an A31 value which is 0 as discussed below for FIG. 4 and is needed to avoid select contention (see FIG. 4 discussion below). At the same time, a data value is provided on the data bus via the processor 32. Both peripherals 36 and 38 decode the address on the address bus and determine that both peripherals 36 and 38 have a location addressed by the address on the data bus since the address spaces overlap. Each peripheral 36 and 38 enables a decode control signal which communicates internal to the each peripheral that an address external on the address bus indicates a location in the peripherals. These respective decode control signals are logically combined (usually via an AND or NAND) with the output of storage 44 and storage 46 respectively. This logical operation results in an asserted control signal in peripheral 38 since storage 46 has an asserted output and results in a deasserted control signal in peripheral 36 since the storage 44 is deasserted. Therefore, due to the fact that the control signal is asserted and A31 is 0 (see FIG. 4) peripheral 38 stores the data value from the data bus, whereas peripheral 36 ignores the data value. The same type of operation may be used to select peripheral 36 while not selecting peripheral 38 by setting the D0 bit instead of the D1 bit in the above example.

When using the structure of FIG. 3 care must be taken that during the above discussed bus cycle wherein peripheral 38 accepts a data value that the A31 bit is negated. For example assume that the peripherals 36 and 38 receive as address inputs A0–A30 and accept A31 only as a CS input. Assume also that all accesses made with A31 set (i.e., A31=1) are accesses to a memory device or a plurality of memory devices (i.e., a memory bank). The memory map for this particular structure would be as illustrated in FIG. 4. Assume then, that a program writes a data value of FFF1H to memory location FFFFFFFFH in the memory space 200. During this write operation, the D1 bit is asserted and the A31 bit is asserted and the peripheral 38 in FIG. 3 is selected for a subsequent write operation. The very next bus cycle is also a write to memory using the data 0000H to the address F0000000H. The bit pattern for F000H=1000 0000 0000 0000 0000 0000 0000 0000. Assume that value of A0–A31, which are 000 0000 0000 0000 0000 0000 0000 0000 are decoded by peripheral and asserts an internal decode signal since a location zero (000 0000 0000 0000 0000 0000 0000 0000) is present in the peripheral 38. If the peripheral 38 does not check A31 (i.e. CS2') then the peripheral 38 will improperly write to location zero the value 0000H while this value is correctly written to memory location F0000000H. This is not acceptable. To avoid this error, the data value into the peripheral 36 or 38 is stored only if the subsequent bus cycle correctly addresses only the address space of the peripherals.

The receipt of A31=0 in the subsequent bus cycle allows the storage elements 44 and 46 to be cleared if set.

In another embodiment the problems discussed above with A31 can be avoided as long as the memory map locations F0000000H through FFFFFFFFH are not used or are partially not used (i.e. dummy space). This lack of use may result in allowing A31 to be ignored and therefore not considered for the subsequent bus cycle wherein data is written to the peripherals.

Note that the address bits accepted by peripherals are generally not as many as A0–30. A0–30 was used in FIG. 4 as an illustration, and peripherals will usually accept address bits for decoding somewhere between one bit and twenty-six bits.

While the present invention has been illustrated and described with reference to specific embodiments, further modifications and improvements will occur to those skilled in the art. For example, address lines and data lines may be coupled in various manners and not exactly as illustrated herein. Bus widths may vary from processor to processor. The method disclosed herein may require at least two bus cycles or as few of one bus as discussed above. In general hundreds of peripherals may be coupled to the processor and not just two as illustrated herein for simplicity. Also, with an N bit bus any number of sets of N peripherals wherein each set of peripherals has conflicting or overlapping address space may be coupled to a processor and correctly accessed without contention given what is taught herein. In general, plurality, as used herein, is intended to mean any finite number greater than one and should not be limited to any particular subrange or constant. It is to be understood, therefore, that this invention is not limited to the particular forms illustrated and that it is intended in the appended claims to cover all modifications that do not depart from the spirit and scope of this invention.

What is claimed is:

1. A method for providing a chip select from a data processor to a selected peripheral, the method comprising the steps of:

sending a data value from the data processor to the selected peripheral via a data bus wherein the data bus is coupled between the data processor and the selected peripheral, the data value having at least one asserted bit and at least one unasserted bit;

receiving, within the selected peripheral, the at least one asserted bit communicated via the data bus, the at least one asserted bit enabling a control line within the selected peripheral, the at least one asserted bit being transmitted via a first data bit line from the data bus wherein the first data bit line is coupled to an input of the selected peripheral, the at least one asserted bit functioning as a chip select signal for the selected peripheral and being stored within the selected peripheral; and providing both: (1) an address to the selected peripheral via an address bus coupled between the data processor and the selected peripheral and (2) a register data value to the selected peripheral via the data bus coupled between the data processor and the selected peripheral, wherein the address corresponds to a register within the selected peripheral and the register data value is stored into the register in response to the asserted control line.

2. The method of claim 1 wherein a second peripheral is coupled to the data processor in addition to the selected peripheral, the second peripheral being coupled to the data processor via the address bus and the data bus, the step of receiving further comprising:

receiving the at least one unasserted bit within the second peripheral, the at least one unasserted bit disabling a control line in the second selected peripheral to result in a disabled control line; and the step of providing further comprising:

providing both: (1) the address to the second peripheral via the address bus coupled between the data processor and the second peripheral and (2) the register data value to the second peripheral via the data bus coupled between the data processor and the second peripheral, wherein the address corresponds to a register within the second peripheral but the register data value is not stored into the register in the second peripheral due to the disabled control line.

3. The method of claim 2 wherein the selected peripheral has a chip select input which affects the state of the control line within the selected peripheral and the second peripheral has a chip select input which affects the state of the control line within the second peripheral, the step of receiving, within the selected peripheral, the at least one asserted bit further comprising:

receiving the at least one asserted bit via a first data bit line from the data bus wherein the first data bit line is coupled to the chip select input of the selected peripheral; and the step of receiving the at least one unasserted bit within the second peripheral further comprises:

receiving the at least one unasserted bit via a second data bit line from the data bus wherein the first data bit line is different from the second data bit line and the second data bit line is coupled to the chip select input of the second peripheral.

4. The method of claim 1 wherein the step of receiving, within the selected peripheral, the at least one asserted bit further comprises:

receiving the at least one asserted bit via a first data bit line from the data bus wherein the first data bit line is coupled to an input of the selected peripheral.

5. The method of claim 1 wherein the step of providing further comprises:

storing the register data value in the register wherein the register is a base address register which determines the address space of at least one other register in the selected peripheral.

6. The method of claim 1 wherein the step of providing further comprises:

simultaneously providing the address and the register data value to a plurality of peripherals other than the selected peripheral wherein each peripheral in the plurality of peripherals does not store the register data value due to a deasserted control signal internal to each peripheral in the plurality of peripherals.

7. The method of claim 1 wherein the step of sending a data value is performed via a first processor clock cycle and the step of providing is performed via a second processor clock cycle which follows the first processor clock cycle in time.

8. The method of claim 1 wherein the step of sending a data value is performed via a first processor clock cycle and the step of providing is performed via the same first processor clock cycle.

9. The method of claim 1 wherein the step of sending a data value from the data processor to the selected peripheral via a data bus further comprises:

sending the data value via a data bus which has N bits, wherein N is a finite number greater than zero, to M peripherals, including the selected peripheral, wherein M is a finite integer less than N and a unique one of the N bits of the data bus is input into a unique one of the M peripherals to result in each of the M peripherals having, as input, a unique data bit from the data bus.

10. The method of claim 9 wherein the M peripherals each have an internal control line which is either asserted or deasserted based upon the corresponding state of the N bits from the data bus.

11. The method of claim 10 wherein the internal control lines determine whether or not the register data value is stored in a base address register within each of the M peripherals.

12. A method for selectively writing a base address register in one peripheral out of a plurality of peripherals wherein each peripheral in the plurality of peripherals has a base address register which is accessed via a same address, the method comprising:

providing a data value via a data bus coupled to a data processor, the data bus having a plurality of bits used to communicate the data value, each peripheral in the plurality of peripherals having a control input, each control input receiving a unique one bit of the plurality of bits in the data bus and thereby receiving, as input, a unique one bit of the data value, each unique one bit functioning as a chip select bit for each peripheral in the plurality of peripherals wherein the chip selects are respectively stored in the plurality of peripherals;

selecting a single peripheral out of the plurality of peripherals by providing a data value having one asserted bit in the data value, the single peripheral being the peripheral which receives and stores the one asserted bit, all other peripherals other than the single peripheral being non-selected peripherals;

providing both an address to all of the peripherals via an address bus and a base address register value to all of the peripherals via the data bus after storage of the chip select bits in respective peripherals in the plurality of peripherals; and selectively storing the base address register value provided via the data bus in the base address register of the single peripheral while all non-selected peripherals do not store the base address value in their corresponding base address registers, the storage of the base address value in the single peripheral defining an address space of the single peripheral.

13. The method of claim 12 wherein the selecting a single peripheral further comprises:

storing a control value in a storage device where in the step of selectively storing is performed in response to the control value.

14. A method for selectively writing a data value to one peripheral out of a plurality of peripherals wherein each peripheral in the plurality of peripherals receives as input a portion of an address bus coupled to a processor, the method comprising:

simultaneously providing both a first control value via a data bus to the plurality of peripherals and a second control value via the address bus to the plurality of peripherals, the data bus having a plurality of bits used to communicate the data value and the first control value in a time multiplexed manner and the address bus having a plurality of bits used to communicate addresses and the second control value in a time multiplexed manner, each peripheral in the plurality of peripherals having a first control input, each first control input receiving a unique one bit of the plurality of bits in the data bus and thereby receiving a unique one bit of the first control value, each peripheral in the plurality of peripherals having a second control input, each second control input receiving a unique one bit of the plurality of bits in the address bus and thereby receiving a unique one bit of the second control value;

selecting a single peripheral out of the plurality of peripherals by determining which peripheral in the plurality of peripherals has an asserted first control input and an asserted second control input, all other peripherals other than the single peripheral being non-selected peripherals;

providing both an address to all of the peripherals in the plurality of peripherals via the address bus and the data value to all of the peripherals via the data bus after the transmission of the first and second control values respectively via the data and address buses; and selectively storing the data value provided via the data bus in the single peripheral while all non-selected peripherals do not store the base address value.

15. The method of claim 14 wherein the step of selectively storing further comprises:

selectively storing the data value in the single peripheral only if the second control input is deasserted when the address is provided to all of the peripherals in the plurality of peripherals in the step of providing.

16. The method of claim 14 wherein each peripheral in the plurality of peripherals does not receive all the address bits in the address bus but instead receives a subset of address bits from the address bus, each peripheral in the plurality of peripherals receiving at least one same address bit so that the address space of each peripheral at least partially overlaps.

17. A data processing system comprising:

a processor having both a first plurality of terminals for providing data via a data bus having a plurality of conductors and a second plurality of terminals for providing addresses via an address bus having a plurality of conductors;

a first peripheral having a first plurality of input terminals for receiving data via the data bus, a second plurality of terminals for receiving addresses via the address bus, a control input for receiving a first unique conductor of the data bus as a chip select, and a base address register internal to the first peripheral which is used to determine an address space of the first peripheral;

a second peripheral having a first plurality of input terminals for receiving data via the data bus, a second plurality of terminals for receiving addresses via the address bus, a control input for receiving a second unique conductor of the data bus as a chip select wherein the first and second unique conductors of the data bus are different conductors, and a base address register internal to the second peripheral which is used to determine an address space of the second peripheral; and wherein a control signal is sent to the first and second peripherals via the data bus wherein only one of the first or second unique conductors provides an asserted signal, the asserted signal selecting one of the first or second peripherals as a selected peripheral, the selected peripheral receiving a subsequent write operation wherein the subsequent write operation is used to write a base address value to the base address register of the selected peripheral.

18. The data processing system of claim 17 wherein the control signal is a data value provided by the processor onto the data bus wherein the data bus is also used to communicate with a memory device.

19. A data processing system comprising:

a processor having both a first plurality of terminals for providing data via a data bus having a plurality of conductors and a second plurality of terminals for providing addresses via an address bus having a plurality of conductors;

a first peripheral having a first plurality of input terminals for receiving data via the data bus, a second plurality of terminals for receiving address information via the address bus, a first control input for receiving a first unique conductor of the data bus, and a second control input for receiving a predetermined one of the conductors of the address bus;

a second peripheral having a first plurality of input terminals for receiving data via the data bus, a second plurality of terminals for receiving address information via the address bus, a first control input for receiving a second unique conductor of the data bus wherein the first and second unique conductors of the data bus are different conductors, and a second control input for receiving said predetermined one of the conductors of the address bus; and wherein a control value is sent to both the first and second peripherals via the first unique conductor, the second unique conductor, and said predetermined one of the conductors of the address bus, wherein the control value along with the predetermined one of the conductors of the address bus selects one of either the first or second peripherals as a selected peripheral, the selected peripheral processing a subsequent write operation wherein the subsequent write operation is used to write a register location of the selected peripheral, any peripheral not selected will not store any information from the subsequent write operation.

20. The data processing system of claim 19 wherein the selected peripheral processes the subsequent write operation to write a register location of the selected peripheral only if the second control input of the selected peripheral is deasserted.

21. A data processor comprising:

a plurality of data terminals for providing a plurality of data bits external to the data processor, each data bit in the plurality of data bits being used to provide at least one chip select signal to one peripheral in a plurality of peripherals external to the data processor, the chip selects being provided in a first clock cycle;

a plurality of address terminals for providing a plurality of address bits to the plurality of peripherals, a predetermined setting of the plurality of address bits representing a base address register in each of the peripherals in the plurality of peripherals; and wherein the data terminals are used to provide both control data and base address register data to the plurality of peripherals wherein the control data selects one peripheral in the plurality of peripherals as a selected peripheral and the base address data is stored only in the selected peripheral, the base address register data being provided by the data bus in a second clock cycle subsequent to the first clock cycle.

22. A method for providing a chip select from a data processor to a selected peripheral wherein the selected peripheral has a chip select input which affects a logic state of a control line within the selected peripheral, the data processor also being coupled to a second peripheral that has a chip select input which affects a state of a control line within the second peripheral, the method comprising the steps of:

sending a data value from the data processor to the selected peripheral and the second peripheral via a data bus wherein the data bus is coupled between the data processor and the selected peripheral and between the data processor and the second peripheral, the data value having at least one asserted bit and at least one unasserted bit;

receiving, within the selected peripheral, the at least one asserted bit communicated via the data bus, the at least one asserted bit enabling a control line within the selected peripheral to result in an enabled control line;

receiving the at least one unasserted bit within the second peripheral, the at least one unasserted bit disabling a control line in the second selected peripheral to result in a disabled control line;

providing both: (1) an address to the second peripheral via the address bus coupled between the data processor and the second peripheral and (2) a register data value to the second peripheral via the data bus coupled between the data processor and the second peripheral, wherein the address corresponds to a register within the second peripheral but the register data value is not stored into the register in the second peripheral due to the disabled control line;

providing, simultaneously in time with the step of providing described above, both the address and the register data value to the selected peripheral wherein the register data value is stored in a register of the selected peripheral due to the enabled control line of the selected peripheral, the steps of providing being performed after the steps of receiving.

23. The method of claim 22 wherein the register data value stored in the selected peripheral is subsequently used to derive an address space of storage elements in the selected peripheral.

24. A method for providing a chip select from a data processor to a selected peripheral, the method comprising the steps of:

sending a data value from the data processor to the selected peripheral via a data bus wherein the data bus is coupled between the data processor and the selected peripheral, the data value having at least one asserted bit and at least one unasserted bit, the step of sending a data value being performed via a first processor clock cycle;

receiving, within the selected peripheral, the at least one asserted bit communicated via the data bus, the at least one asserted bit enabling a control line within the selected peripheral; and providing both an address to the selected peripheral via an address bus coupled between the data processor and the selected peripheral and a register data value to the selected peripheral via the data bus coupled between the data processor and the selected peripheral, wherein the address corresponds to a register within the selected peripheral and the register data value is stored into the register in response to the asserted control line, the step of providing being performed via a second processor clock cycle which follows the first processor clock cycle in time.

25. A method for providing a chip select from a data processor to a selected peripheral, the method comprising the steps of:

sending a data value from the data processor to the selected peripheral via a data bus wherein the data bus is coupled between the data processor and the selected peripheral, the data value having at least one asserted bit and at least one unasserted bit;

receiving, within the selected peripheral, the at least one asserted bit communicated via the data bus, the at least one asserted bit enabling a control line within the selected peripheral; and providing both an address to the selected peripheral via an address bus coupled between the data processor and the selected peripheral and a register data value to the selected peripheral via the data bus coupled between the data processor and the selected peripheral, wherein the address corresponds to a register within the selected peripheral and the register data value is stored into the register in response to the asserted control line, wherein the step of sending a data value is performed via a first processor clock cycle and the step of providing is performed via the same first processor clock cycle.

26. A method for providing a chip select from a data processor to a selected peripheral, the method comprising the steps of:

sending a data value from the data processor to the selected peripheral via a data bus wherein the data bus is coupled between the data processor and the selected peripheral, the data value having at least one asserted bit and at least one unasserted bit, the data value being sent via a data bus which has N bits, wherein N is a finite number greater than zero, to M peripherals, including the selected peripheral, wherein M is a finite integer less than N and a unique one of the N bits of the data bus is input into a unique one of the M peripherals to result in each of the M peripherals having, as input, a unique data bit from the data bus;

receiving, within the selected peripheral, the at least one asserted bit communicated via the data bus, the at least one asserted bit enabling a control line within the selected peripheral; and providing both an address to the selected peripheral via an address bus coupled between the data processor and the selected peripheral and a register data value to the selected peripheral via the data bus coupled between the data processor and the selected peripheral, wherein the address corresponds to a register within the selected peripheral and the register data value is stored into the register in response to the asserted control line.

27. The method of claim 26 wherein only one bit of the M bits received by the M peripherals is asserted so that only one of the M peripherals will receive the register data value.

28. The method of claim 26 wherein the M peripherals each have an internal control line which is either asserted or deasserted based upon the corresponding state of the N bits from the data bus.

29. The method of claim 28 wherein the internal control lines determine whether or not the register data value is stored in a base address register within each of the M peripherals.

* * * * *